United States Patent
Andre et al.

(10) Patent No.: US 7,374,178 B2
(45) Date of Patent: May 20, 2008

(54) WORKPIECE HOLDER

(75) Inventors: William M. Andre, Rochester Hills, MI (US); Bruce W. Irwin, Sr., Ft. Pierce, FL (US)

(73) Assignee: Hydra-Lock Corporation, Mt. Clemens, MI (US)

( * ) Notice: Subject to any disclaimer, the term of this patent is extended or adjusted under 35 U.S.C. 154(b) by 460 days.

(21) Appl. No.: 10/765,287

(22) Filed: Jan. 27, 2004

(65) Prior Publication Data

US 2005/0161888 A1    Jul. 28, 2005

(51) Int. Cl.
*B23B 5/22* (2006.01)
*B23B 31/10* (2006.01)

(52) U.S. Cl. .................. 279/4.03; 279/2.06

(58) Field of Classification Search ...... 279/2.06–2.08, 279/4.03, 4.05, 133, 139, 4.04
See application file for complete search history.

(56) References Cited

U.S. PATENT DOCUMENTS

| | | | |
|---|---|---|---|
| 2,744,756 A | 5/1956 | Atherholt, Sr. et al. | |
| 2,797,604 A | 7/1957 | Atherholt et al. | |
| 3,030,120 A | 4/1962 | Atherholt, Sr. | |
| 3,250,542 A * | 5/1966 | Winnen et al. | 279/2.08 |
| 3,335,569 A | 8/1967 | Atherholt, Sr. | |
| 3,677,559 A | 7/1972 | Andre et al. | |
| 4,533,287 A * | 8/1985 | Hagemeyer et al. | 409/234 |
| 4,651,643 A * | 3/1987 | Katz et al. | 101/375 |
| 4,694,559 A | 9/1987 | Lundy et al. | |
| 4,699,389 A * | 10/1987 | Buck | 279/52 |
| 4,953,877 A * | 9/1990 | Slachta et al. | 279/2.05 |
| 4,958,969 A * | 9/1990 | Och | 409/234 |
| 5,088,746 A | 2/1992 | Dietz et al. | |
| 5,286,042 A | 2/1994 | Laube | |
| 5,429,375 A * | 7/1995 | Mueller et al. | 279/2.02 |
| 5,429,376 A * | 7/1995 | Mueller et al. | 279/4.07 |
| 5,441,284 A * | 8/1995 | Mueller et al. | 279/2.02 |
| 5,516,243 A | 5/1996 | Laube | |
| 5,944,325 A | 8/1999 | Schmeisl | |
| 6,000,687 A | 12/1999 | Andre | |
| 6,015,154 A * | 1/2000 | Andre et al. | 279/2.07 |
| 6,077,003 A | 6/2000 | Laube | |
| 6,179,530 B1 | 1/2001 | Retzbach | |

FOREIGN PATENT DOCUMENTS

DE    4224872 A1 *    2/1994

* cited by examiner

*Primary Examiner*—Dana Ross
(74) *Attorney, Agent, or Firm*—Reising, Ethington, Barnes, Kisselle, P.C.

(57) ABSTRACT

A workholding apparatus including a body and a drive member carried by the body, so that the drive member and body partially define a fluid chamber therebetween for containing a fluid. The drive member includes an annular flange that axially abuts and that attaches to the body to resist torsional twisting of the drive member relative to the body. A driven member is also carried by the body and includes multiple displacement reliefs therein. Interengagement features are provided between the driven member and other components of the workholding apparatus, such as the drive member, to resist torsional twisting of the driven member.

2 Claims, 4 Drawing Sheets

WORKPIECE HOLDER

FIELD OF THE INVENTION

This invention relates generally to machine tools and more particularly to hydrostatic workpiece holders.

BACKGROUND OF THE INVENTION

Various hydrostatic workpiece holders are known, such as that disclosed in U.S. Pat. No. 6,015,154, which has one or more chambers containing a fluid which, when pressurized, displace one or more polymeric rings which in turn displace one or more metal sleeves into engagement with a workpiece. While such hydrostatic tool holders are effective and reliable under most conditions, the performance and durability can be improved upon for high performance applications.

SUMMARY OF THE INVENTION

In some high performance applications, a more robust workpiece holder is required because cutting tool forces are abnormally high due to the extreme hardness of the workpiece material. The more robust workpiece holder should have a collet with interengagement features that resist twisting of the collet under such conditions.

A workholding apparatus, such as an arbor, includes a body and a drive member carried by the body, so that the drive member and body partially define a fluid chamber therebetween for containing a pressurized fluid. A driven member is likewise carried by the body, and includes a displacement relief therein. In an exemplary embodiment, the driven member is disposed about the exterior of the body so that the pressure or force of the pressurized fluid in the fluid chamber acts radially outwardly on the driven member to displace or expand the driven member into engagement with the inner surface of a workpiece. In any case, the force of the pressurized fluid is transferred through the drive member to displace the driven member. Uniquely, the driven member is equipped with interengagement features that serve to fix the driven member to another relatively fixed member of the workpiece holder to resist or prevent twisting of the driven member under high torsional loads due to high cutting forces. It is contemplated that the principles of the exemplary embodiment apply equally well to a chuck-type workpiece holder.

Objects, features, and advantages of this invention include providing a workpiece holder which has a driven member that is interengaged to other relatively fixed members of the workpiece holder, is resistant to twisting, can be used to firmly hold and locate workpieces composed of exceptionally hard material that undergo exceptionally high cutting forces, provides a better finish of the machined workpiece, repeatably and reliably holds and locates workpieces, reliably centers each workpiece, can be displaced generally radially inwardly or radially outwardly, and is of relatively simple design and economical manufacture and assembly and has a relatively longer useful life in service.

BRIEF DESCRIPTION OF THE DRAWINGS

These and other objects, features and advantages of this invention will be apparent from the following detailed description of the preferred embodiments and best mode, appended claims, and accompanying drawings in which:

DETAILED DESCRIPTION OF THE PREFERRED EMBODIMENTS

Figure 1:
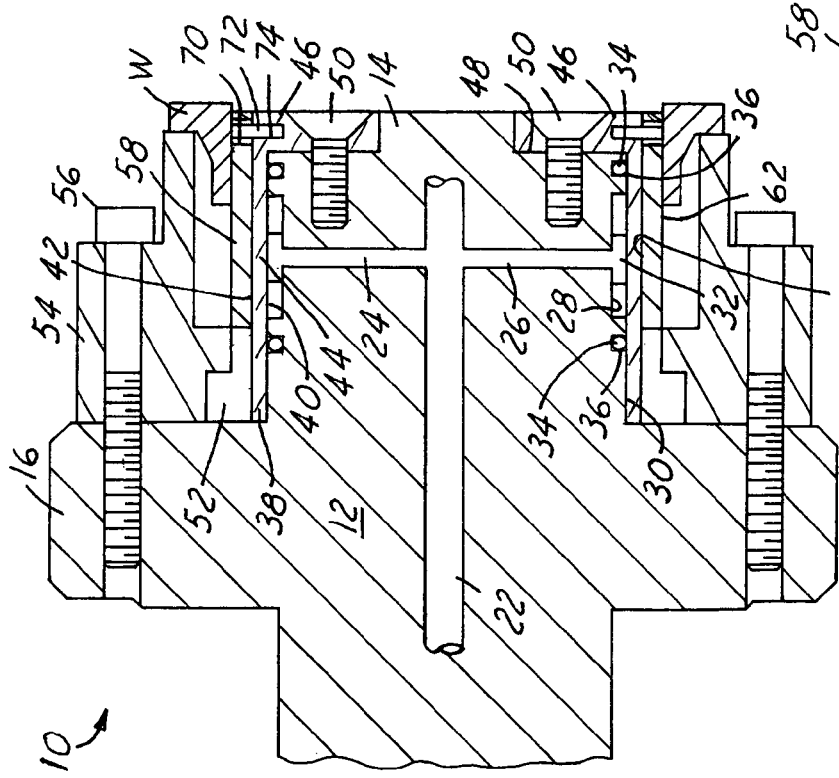
FIG. 1 is a cross-sectional view of an arbor embodying the present invention.

Referring in detail to the drawings, FIG. 1 illustrates a hydrostatic workpiece holder, and more specifically, a hydrostatic arbor 10 for holding a workpiece W. The arbor 10 includes a body 12 having a cylindrical shaft or mandrel portion 14 and a radially extending mounting flange portion 16. The body 12 includes a main fluid passage 22 and branch fluid passages 24, 26 that are constructed to be filled with a pressurized fluid. As is well known in the art, the main fluid passage 22 is supplied with pressurized fluid from a remote pump (not shown). An external annular recess 28 in an outer surface 30 of the mandrel portion 14 of the body 12 partially defines a fluid chamber 32 that is sealed by resilient polymeric rings 34, such as O-rings, that are disposed within annular grooves 36 in the mandrel portion 14.

A circumferentially continuous expansible sleeve or diaphragm 38 is adjacent to and circumscribes the mandrel portion 14 of the body 12 and thereby partially defines the fluid chamber 32. The diaphragm 38 includes an inner cylindrical surface 40 that cooperates with the outer surface 30 of the mandrel portion 14 of the body 12 and further includes an oppositely disposed outer cylindrical surface 42. The diaphragm 38 may be manufactured by injection molding, machined from a solid block, and the like, and may be composed of a polymeric material such as Delrin®, Nylon®, polyurethane, or the like. In any case, the diaphragm 38 is composed of any material that permits radially outward displacement of a mid-section 44 of the diaphragm 38 under the fluid pressure force acting thereon, yet enables the diaphragm 38 to retain surface contact with the polymeric rings 34. An annular flange 46 is integrally provided on the diaphragm. The annular flange 46 axially abuts a stepped portion 48 of the body 12 and is fastened thereto by countersink screws 50. Accordingly, the annular flange 46 prevents or at least resists torsional twisting of the diaphragm 38 relative to other components and provides a rigid foundation for mounting other components thereto.

A stepped ring 52 radially circumscribes a rearward portion of the diaphragm 38 and is provided for rigidly trapping the diaphragm 38 to the body 12 to resist blowout or leakage of fluid therebetween. The stepped ring 52 is rigidly secured to the body 12 by a stop ring 54 and cap screws 56 as shown.

Figure 3:
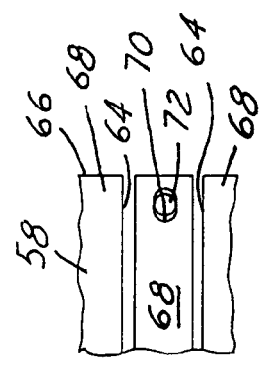
FIG. 3 is an enlarged view of a portion 3-3 of the arbor of FIG. 2.

A split sleeve or collet 58 is adjacent to and circumscribes the diaphragm 38. Accordingly, the collet 58 and diaphragm 38 are in a relatively lapped relationship. The collet 58 includes an inner surface 60 that engages the outer surface 42 of the diaphragm 38. The collet 58 further includes an oppositely disposed outer surface 62 and is generally tubular or cylindrical in shape. As shown in FIG. 3, the collet 58 includes a plurality of circumferentially spaced and longitudinally extending through slots or displacement reliefs 64 formed therein such as by milling or electro-discharge machining. The reliefs 64 are formed into a free end 66 of the collet 58 and are bounded by bearing sections 68 as shown, as is well known in the art of collet design. The reliefs 64 sufficiently weaken the collet 58 for facilitating radial displacement of at least the bearing sections 68 of the collet 58. The collet 58 may be composed of a metal such as hardened SAE 4130 or any other suitable metal. Nevertheless, the collet 58 is composed of a material and constructed in a manner to permit outward radial displacement thereof. In any case, a predefined number of axially extending slots 70 are provided through respective bearing sections 68 of the collet 58.

Likewise, a predefined number of interengagement elements or drive pins 72 extend radially through the slots 70 and radially into radial holes 74 of the annular flange 46 of the diaphragm 38, as shown most clearly in FIG. 1. The slots 70 are elongated in an axial or longitudinal direction with respect to the longitudinal axis of the arbor 10. Accordingly, the bearing sections 68 are restrained from displacement in a circumferential direction, but are somewhat free to move in an axial direction. Such a configuration accommodates the normal displacement action of a collet 58, and prevents the collet 58 from binding. Preferably, the number of slots 70, drive pins 72, and holes 74 is twenty-four, but any reasonable number will suffice. The interconnection or interengagement of the collet 58 to the diaphragm 38 serves to substantially resist or prevent the collet 58 from twisting relative to the diaphragm 38. Absent such an interengagement element, the collet 58 will twist relative to the diaphragm 38 under high-load conditions such as when using the arbor 10 in the machining of extremely rigid or hard workpieces.

In assembly, the polymeric rings 34 are stretched over the mandrel portion 14 of the body 12 and positioned into the annular grooves 36, as shown in FIG. 1. The diaphragm 38 is then telescoped or assembled coaxially over the end of the mandrel portion 14 into axial abutment with the flange portion 16 of the body 12 and in circumferential sealing engagement with the resilient polymeric rings 34 to compress the rings 34 and seal the fluid chamber 32. The annular flange 46 of the diaphragm 38 abuts the stepped portion 48 of the mandrel portion 14 of the body 12 and is attached thereto, such as by the screws 50, but may otherwise be attached in any other manner. The stepped ring 52 is then assembled over the diaphragm 38 and located against the flange 16 of the body 12. The collet 58 is then assembled over the diaphragm 38 into abutment with the stepped ring 52. The drive pins 72 are then inserted through the collet 58 and preferably press fit into the diaphragm 38, such that the drive pins 72 are recessed below the outer surface 62 of the collet 58. The stop ring 54 is then assembled over the above-mentioned components and fastened to the flange 16 of the body 12 by the cap screws 56. Accordingly, the mandrel portion 14 of the body 12 carries thereon the various assembled components described above to constitute the arbor 10.

In use, the workpiece W is disposed over the outer surface 62 of the collet 58 until the workpiece W axially engages a portion of the stop ring 54. The workpiece W may be a cast iron sleeve, a gear blank, or any other workpiece suitable for mounting on an arbor. In the machining of rigid and hard workpieces, such as those made from INCONEL and other hard materials, the workpieces often undergo substantially high cutting forces, such that workpieces tend to twist or spin on conventional arbors. This is because collets, or bearing sections thereof, circumferentially flex under the strain of the high cutting forces and, thus, tend to release their hold on the workpieces. Thus, the interengagement configurations of the present invention are required to firmly hold and accurately locate such workpieces on the arbor 10.

To firmly hold the workpiece W on the arbor 10, fluid under pressure is provided from an external or internal source through the main fluid passage 22 and branch fluid passages 24, 26 and into the fluid chamber 32. The force of the pressurized fluid radially outwardly displaces the resilient diaphragm 38 which firmly engages and radially outwardly displaces the collet 58 to urge the collet 58 into firm engagement with an inner surface of the workpiece W to firmly hold and accurately locate the workpiece W for machining operations to be performed thereon. To remove the workpiece W after machining operations, the pressure of the fluid supplied to the fluid chamber 32 is decreased, thereby decreasing the pressure of the fluid in the fluid chamber 32 to thereby relax the diaphragm 38 and collet 58. Thus, the diaphragm 38 acts as a drive member to radially outwardly urge a driven member (collet 58) into engagement with the workpiece W.

Figure 2:
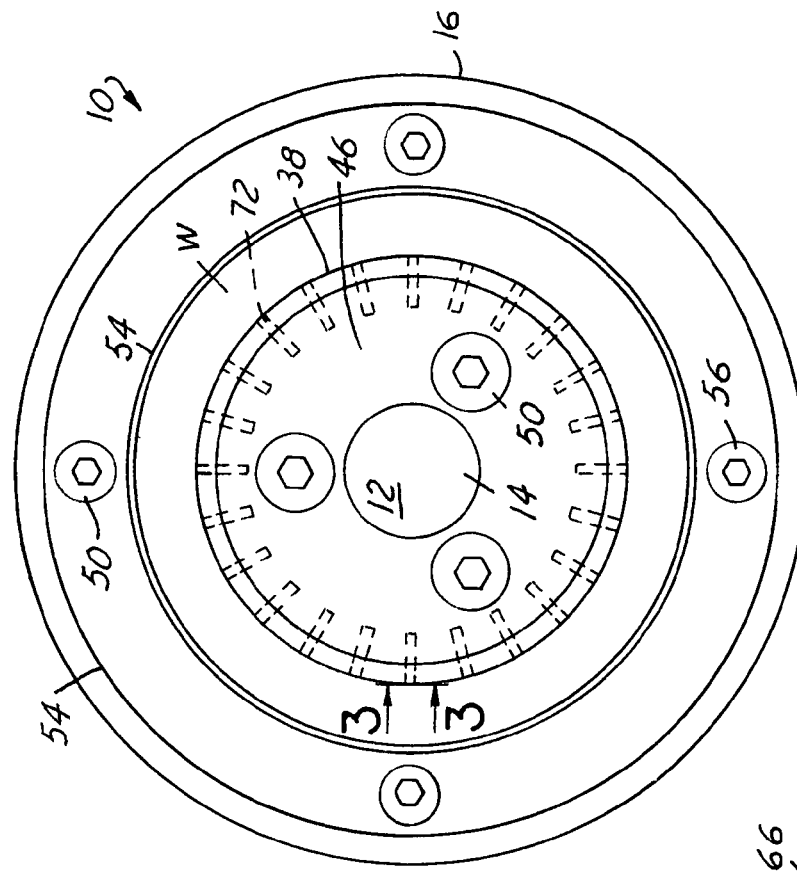
FIG. 2 is an end view of the arbor of FIG. 1.
Figure 4:
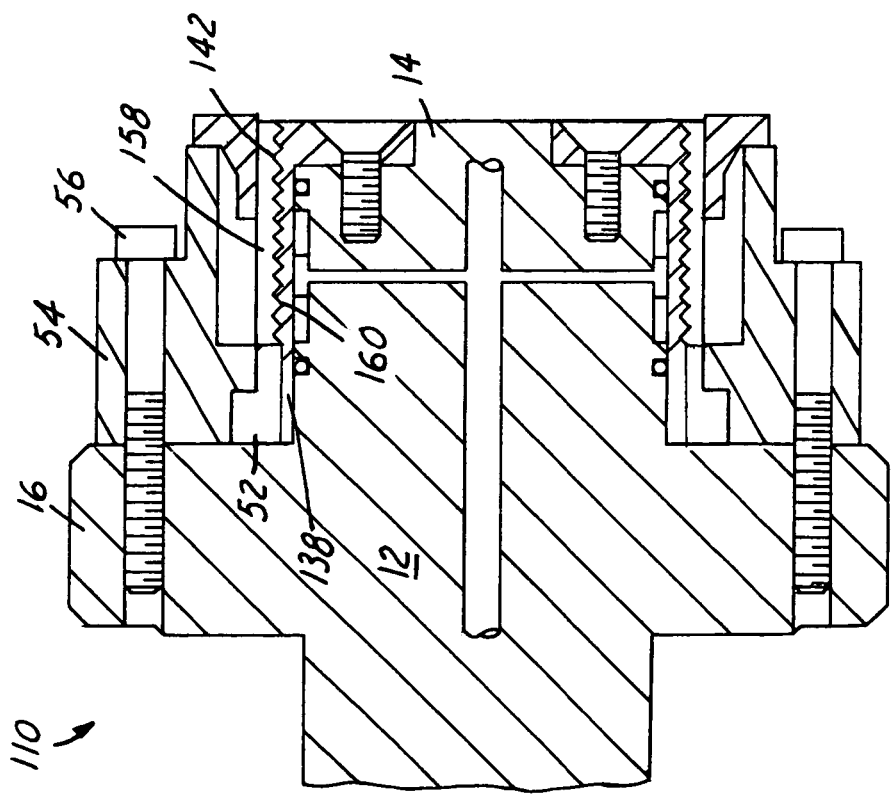
FIG. 4 is a cross-sectional view of an arbor according to an alternative embodiment of the present invention.

Referring now to a second embodiment, FIG. 4 illustrates a hydrostatic workpiece holder, and more specifically, a hydrostatic arbor 110. The arbor 110 is similar to the embodiment of FIGS. 1 through 3 except for the interengagement structure between a diaphragm 138 and a collet 158. Accordingly, for brevity and clarity, details in common between the two embodiments will be omitted from further discussion of the arbor 110. The diaphragm 138 includes a threaded outer surface 142, while the collet 158 includes a threaded inner surface 160 that threadingly engages the outer surface 142 of the diaphragm 138. The assembly of the arbor 110 is largely the same as the previous embodiment with one exception. The collet 158 is threaded onto the diaphragm 138 in a circumferential direction that is the same as the circumferential direction of the cutting forces acting on the workpiece W or, in other words, in a circumferential direction that is opposite of the rotation of the arbor 110 and workpiece W under cutting conditions.

Figure 5:
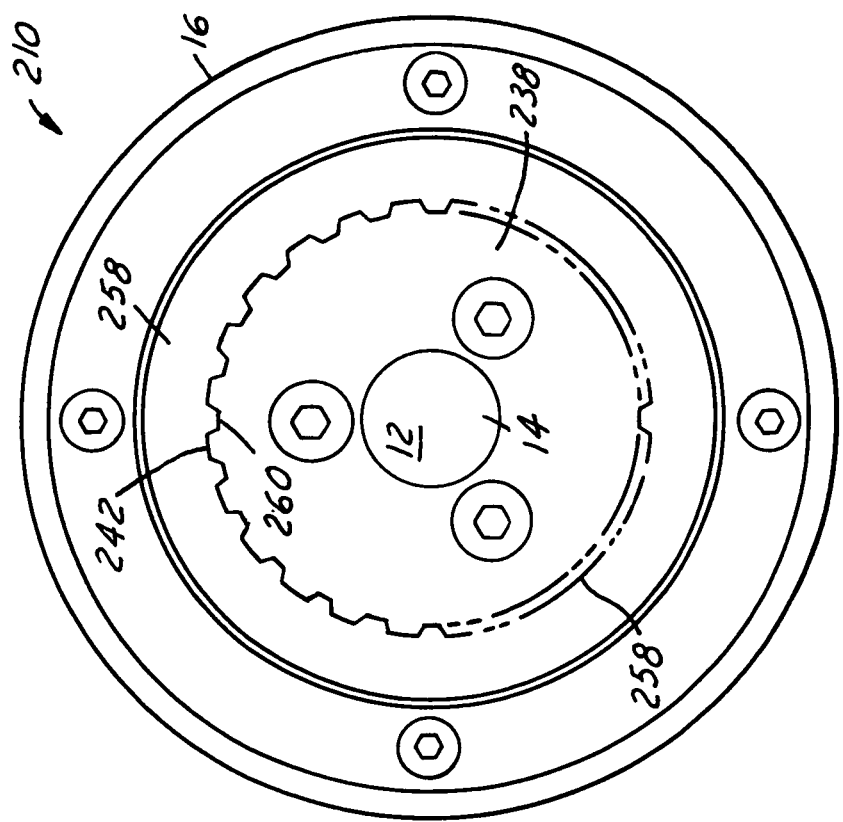
FIG. 5 is an end view of an arbor according to another alternative embodiment of the present invention.

FIG. 5 illustrates a third embodiment of a hydrostatic arbor 210. Again, the arbor 210 is similar to the arbor 10 embodiment of FIGS. 1 through 3 except for the interengagement structure between a diaphragm 238 and a collet 258. The diaphragm 238 includes a splined outer surface 242, while the collet 258 includes a complementary splined inner surface 260 that interengages the outer surface 242 of the diaphragm 238. The assembly of the arbor 210 is essentially the same as the first embodiment.

Figure 7:
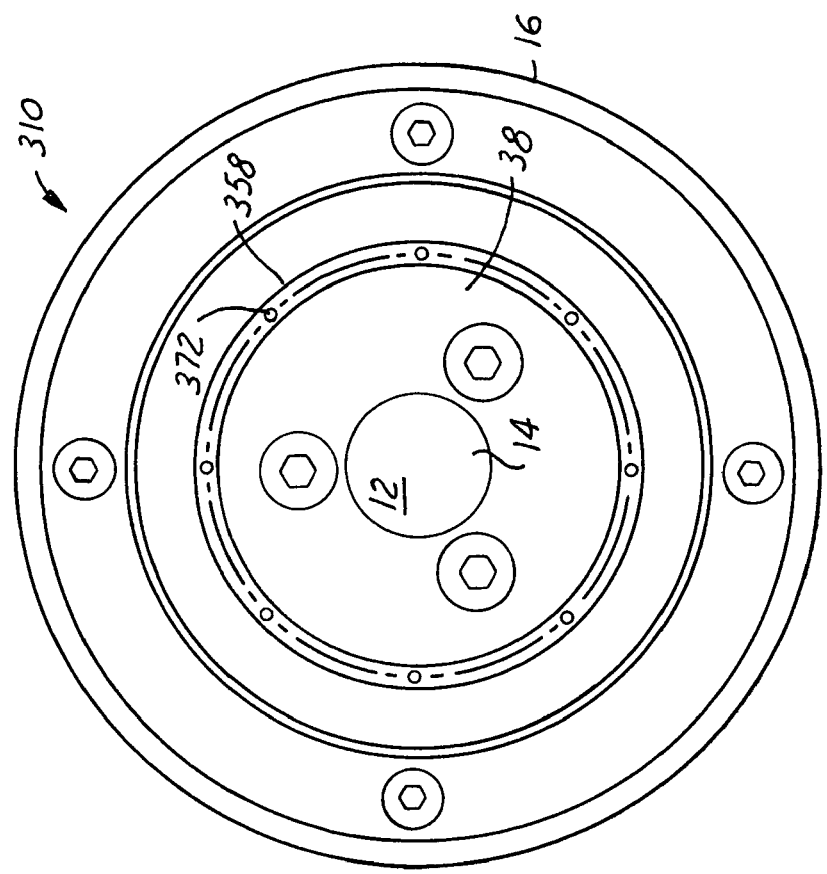
FIG. 7 is an end view of the arbor of FIG. 6.
Figure 6:
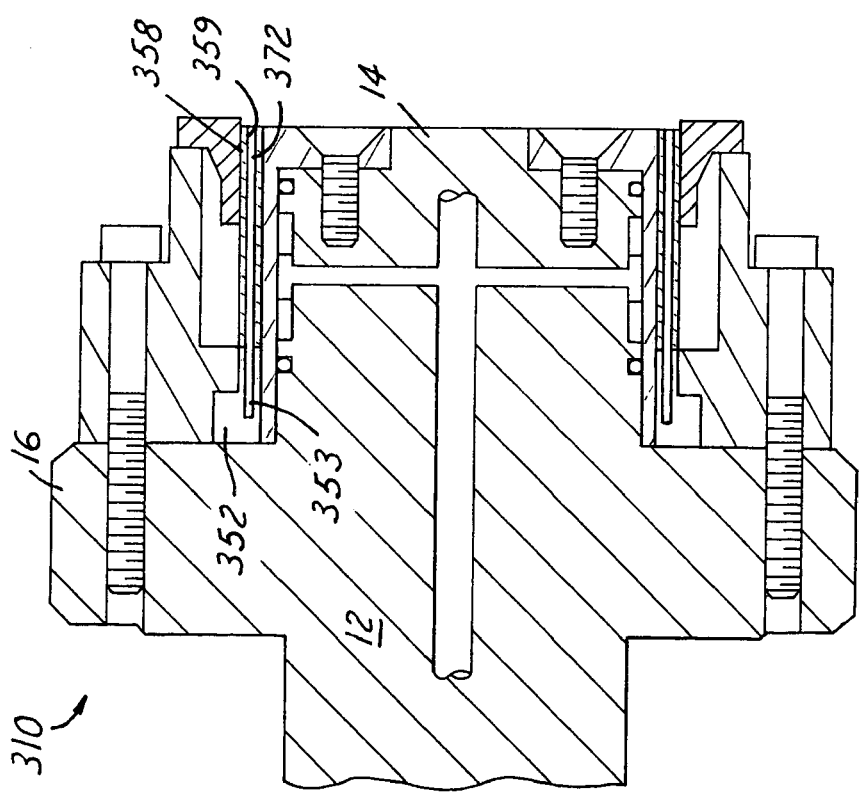
FIG. 6 is a cross-sectional view of an arbor according to an alternative embodiment of the present invention.

FIGS. 6 and 7 illustrate a fourth embodiment of a hydrostatic arbor 310. The arbor 310 is similar to the first embodiment of FIGS. 1 through 3, except that a stepped ring 352 and a collet 358 are provided with an equidistantly spaced plurality of holes 353 and 359 therein and therethrough respectively. Also, a plurality of interengagement elements or drive pins 372 are slidably received within the holes 359 and preferably press fit into the holes 353, thereby affixing the collet 358 relative to the stepped ring 352 to resist twisting of the collet 358. The assembly of the arbor 310 is similar to the first embodiment, except that it may be desirable to sub-assemble the stepped ring 352, drive pins 372, and collet 358, and then slide the resultant sub-assembly over the diaphragm 38.

Figures 8, 9:
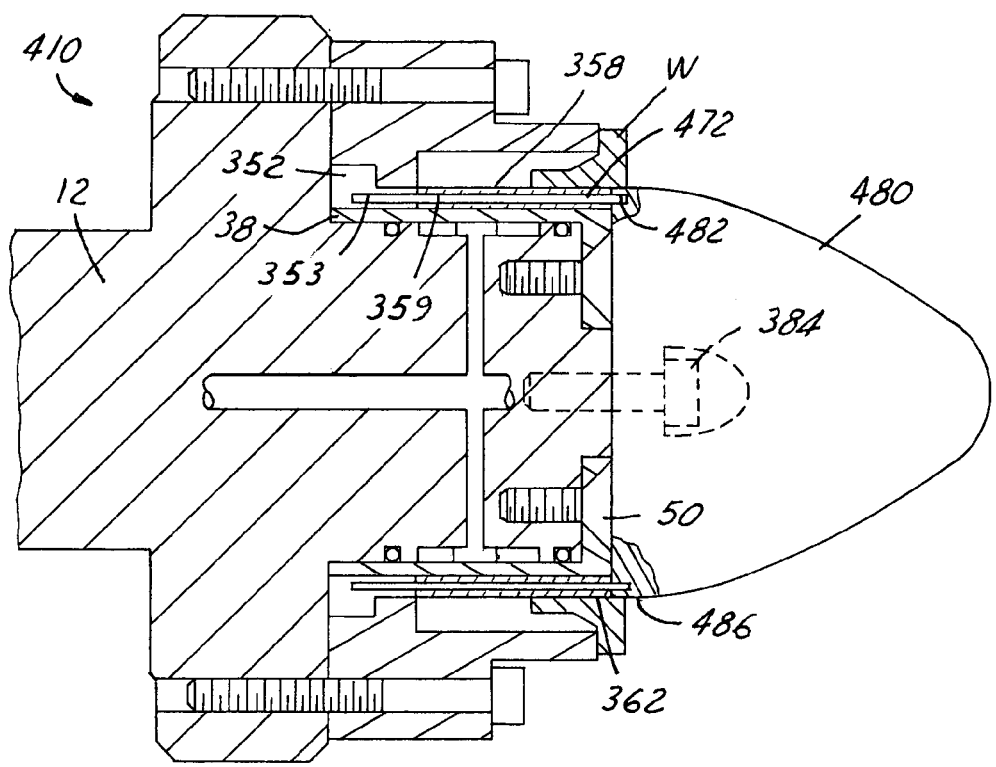
FIG. 8 is a cross-sectional view of an arbor according to an alternative embodiment of the present invention.
FIG. 9 is an end view of the arbor of FIG. 8.

FIGS. 8 and 9 illustrate a fifth embodiment of an arbor 410 that is similar to the previously described embodiment.

In this embodiment, however, a nose piece 480 is attached to the body 12. Again, the stepped ring 352 and collet 358 are provided with an equidistantly spaced plurality of holes 353 and 359 therein and therethrough respectively. Also, a plurality of interengagement elements or drive pins 472 are received within the holes 359 and preferably press fit into the holes 353 to fix the collet 358 relative to the stepped ring 352, and thereby resist twisting of the collet 358. The nose piece 480 is also provided with a plurality of holes 482 into which the drive pins 472 extend for additional support and resistance against twisting of the collet 358. The nose piece 480 is attached to the body 12 by a plurality of equidistantly spaced cap screws 484, which have a bolt pattern that is clocked with respect to the bolt pattern of countersink screws 50. The assembly of the arbor 410 is similar to the previously described embodiment, wherein it may be desirable to sub-assemble the stepped ring 352, drive pins 472, and collet 358 and then slide the resultant sub-assembly over the diaphragm 38. Subsequently, the nose piece 480 is assembled to the body 12 such that the drive pins 472 align with and insert into the holes 482. Then the cap screws 484 are fastened through the nose piece 480 and into the body 12. The nose piece 480 has an outer diameter 486 that is slightly smaller than the outer diameter 362 of the collet 358, whereby the nose piece 480 acts as an assembly aid to facilitate the quick and reliable location of the workpiece W to the arbor 410.

The drive pin and hole interengagement features of the above-described embodiments need not involve individual components that are separately assembled to the arbor. Rather, the drive pins and holes can be integrated into one or more of the collet, stepped ring, diaphragm, and nose piece. For example, such integrated drive pins could take the form of tab and slot, or tongue and groove configurations. More specifically, the collet could be provided with castellations formed in one or both axial end thereof that interengages with similar castellations formed in the stepped ring, diaphragm, and/or nose piece. In any case, the drive pin or interengagement element designs of the above described arbor embodiments add a unique and unobvious feature to the art of workpiece holders. Under high performance applications where a workpiece undergoes abnormally high cutting forces, the interengagement concept of the present invention provides a simple, inexpensive, and effective way to resist or prevent the collet from twisting and failing to hold the workpiece, and thereby bolsters the maximum clamping or gripping force of the arbor. Accordingly, the arbor will achieve longer tool life and can handle extremely high cutting force conditions to provide greater holding power without twisting and failure of the collet.

While the forms of the invention herein disclosed constitute a presently preferred embodiment, many others are possible. It is not intended herein to mention all the possible equivalent forms or ramification of the invention. It is understood that terms used herein are merely descriptive, rather than limiting, and that various changes may be made without departing from the spirit or scope of the invention.

We claim:

1. A workholding apparatus comprising:
a body;
at least one drive member carried by said body and having a portion that is radially displaceable, said at least one drive member and said body at least partially defining a fluid chamber therebetween for containing a fluid, said at least one drive member having an annular flange portion axially abutting and attached to at least a portion of said body to resist rotation of the at least one drive member relative to the body;
at least one driven member carried by said body, said at least one driven member having at least one displacement relief therein;
a ring member disposed axially rearward of said at least one driven member;
at least one drive pin extending axially through at least a portion of said at least one driven member and into a portion of said ring member to resist said at least one driven member from twisting relative to said at least one drive member; and
a nose piece mounted to said body axially forward of said at least one driven member, said at least one drive pin further extending axially into a portion of said nose piece to further resist said at least one driven member from twisting relative to said at least one drive member.

2. An apparatus to releasably retain a workpiece, said apparatus comprising:
a body;
at least one diaphragm carried by said body and defining at least in part a fluid chamber constructed to contain a fluid and having a portion that is radially displaceable, said at least one diaphragm having an annular flange portion axially abutting and attached to at least a portion of said body to resist rotation of the at least one diaphragm relative to the body;
at least one collet having at least one displacement relief, a diaphragm engaging surface, and a workpiece engaging surface, said at least one collet being carried by said body;
whereby when said fluid in said fluid chamber is pressurized a drive force is transmitted through said at least one diaphragm and said at least one collet to urge said at least one collet into engagement with the workpiece to releasably retain the workpiece
a ring member disposed axially rearward of said at least one collet;
at least one drive pin extending axially through said at least one collet and into a portion of said ring member to resist said at least one collet from twisting relative to said at least one diaphragm; and
a nose piece mounted to said body axially forward of said at least one collet, said at least one drive pin further extending axially into a portion of said nose piece to further resist said at least one collet from twisting relative to said at least one diaphragm.

* * * * *